Figure 10:
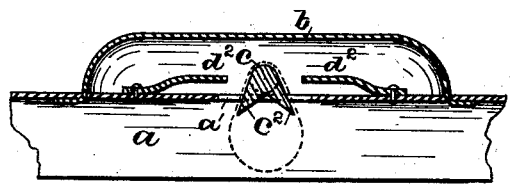

(No Model.) 3 Sheets—Sheet 1.
R. W. CHAPMAN.
SPRING SIDE CATCH FOR SATCHELS, &c.
No. 375,340. Patented Dec. 27, 1887.
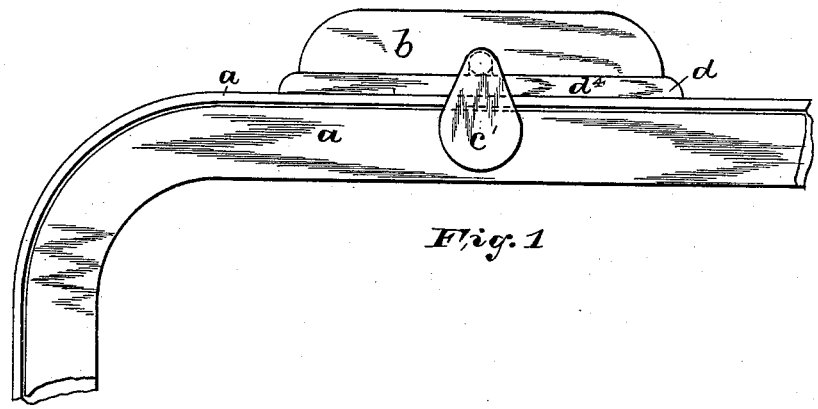
Fig. 1
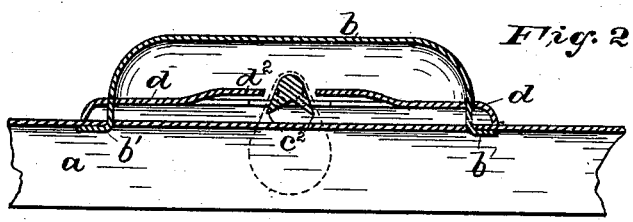
Fig. 2
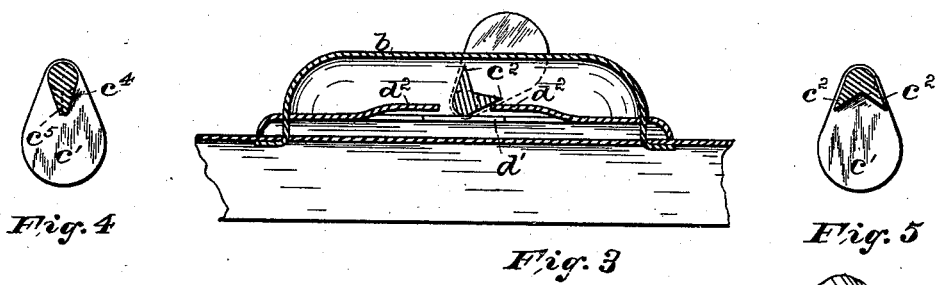
Fig. 4  Fig. 3  Fig. 5
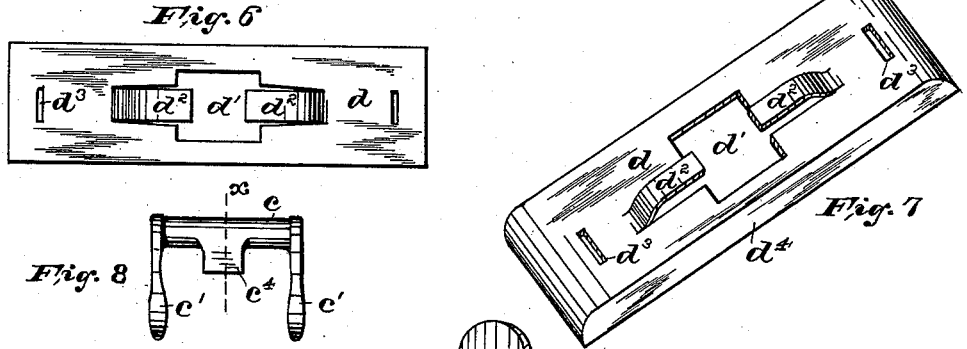
Fig. 6
Fig. 8  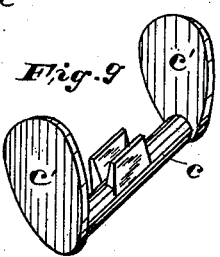  Fig. 7
WITNESSES:  Fig. 9  INVENTOR:
J. L. Bartine  Robert W. Chapman
L. S. Cook.  BY Campbell & G. ATTYS.
N. PETERS, Photo-Lithographer, Washington, D. C.

(No Model.) 3 Sheets—Sheet 2.
R. W. CHAPMAN.
SPRING SIDE CATCH FOR SATCHELS, &c.
No. 375,340. Patented Dec. 27, 1887.
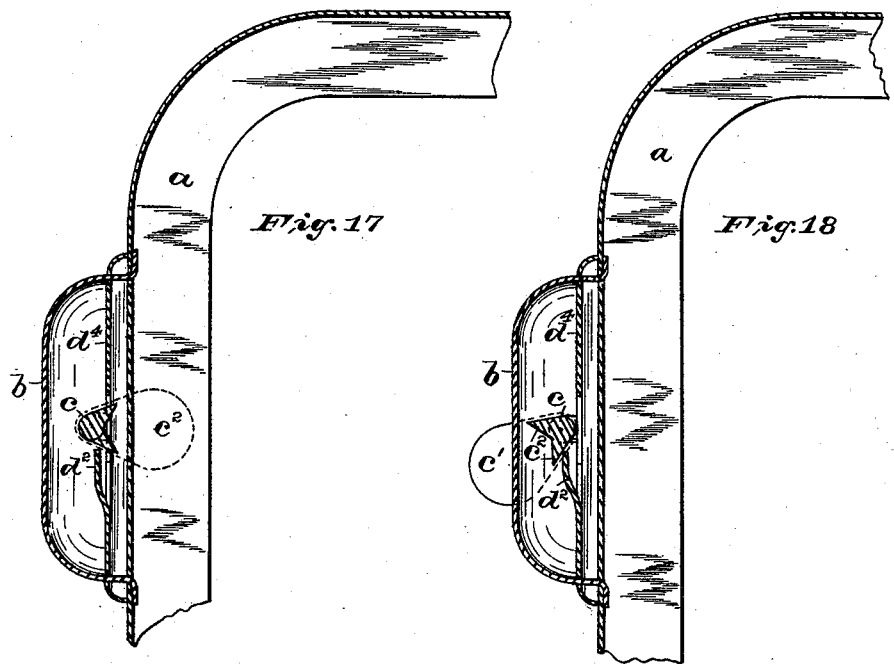
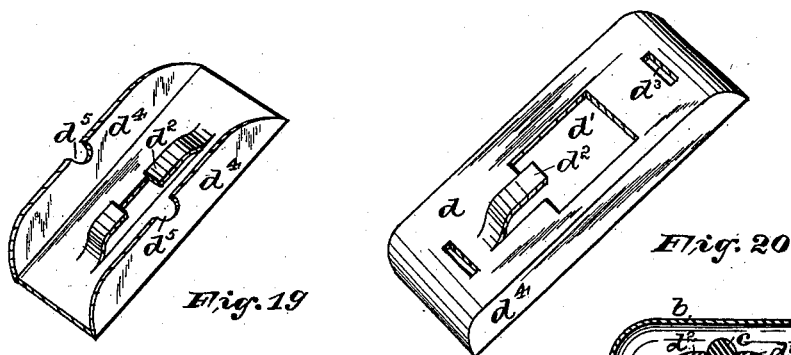
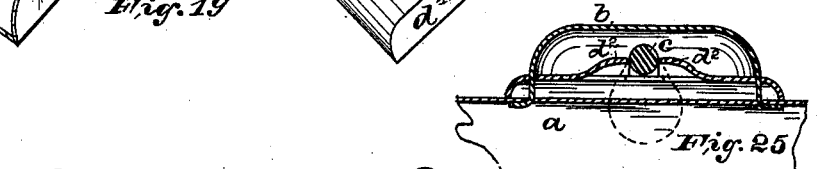
WITNESSES:
J. L. Bartine
L. S. Cook.
INVENTOR:
Robert W. Chapman
BY Campbell & Co. ATTYS.

(No Model.)　　　　　　　　　　　　　　　　　　3 Sheets—Sheet 3.
R. W. CHAPMAN.
SPRING SIDE CATCH FOR SATCHELS, &c.

No. 375,340.　　　　　　　　　Patented Dec. 27, 1887.

WITNESSES:　　　　　　　　　　　　INVENTOR:

J. K. Bartine　　　　　　　　　　Robert W. Chapman
L. S. Cook.
　　　　　　　　　　　　　　　BY Campbell & Co. ATTYS.

UNITED STATES PATENT OFFICE.

ROBERT W. CHAPMAN, OF NEWARK, NEW JERSEY.

SPRING SIDE-CATCH FOR SATCHELS, &c.

SPECIFICATION forming part of Letters Patent No. 375,340, dated December 27, 1887.

Application filed September 5, 1887. Serial No. 248,788. (No model.)

*To all whom it may concern:*

Be it known that I, ROBERT W. CHAPMAN, a citizen of the United States, residing at Newark, in the county of Essex and State of New Jersey, have invented certain new and useful Improvements in Spring Side-Catches for Satchels or Traveling-Bags; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in a class of bag-fastenings, which consists, essentially, of a pivoted bar provided with arms or ears on opposite ends thereof, which hold the frame section of the bag together when turned into holding engagement, and is arranged within a suitable casing, within which is also placed a spring which bears against the turning-bar and by the friction thereof holds the said bar in its fastened or unfastened position.

In this class of fastenings, as heretofore made, the spring and turning-bar bear one against the other and by the friction thus produced, the bar is held as desired. In this construction there is a constant wear of the bar upon the spring, which soon weakens the spring and destroys the elasticity.

The purpose of my invention is to avoid this constant wear between the bar and spring, and at the same time, by reason of the arrangement of the spring, hold the locking-bar in either its unfastened or fastened position. I accomplish this result by means of the construction shown in the accompanying sheets of drawings, in which—

Figure 1 is a side elevation of a portion of the bag-frame upon which is secured my improved fastener, also in elevation. Fig. 2 is a longitudinal section of the same, taken centrally therethrough in its locked or fastened position. Fig. 3 is a view similar to Fig. 2, but showing the turning-bar in its unlocked position. Figs. 4 and 5 are sections of the turning-bar, showing a method of construction thereof. Figs. 6 and 7 are a plan and perspective view, respectively, of the spring-plate; and Figs. 8 and 9 are a side elevation and perspective view, respectively, of the turning-bar.

Figure 11:
Figure 12:
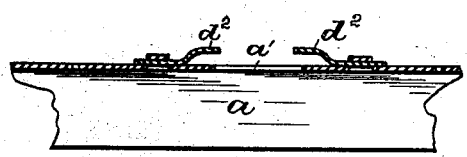
Figure 13:
Figure 14:
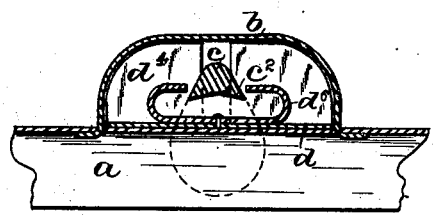
Figure 15:
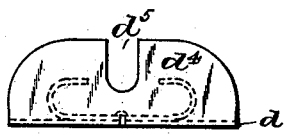
Figure 16:
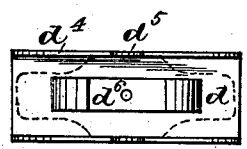

On Sheet 2, Fig. 10 is a section of the improved fastening and frame to which it is attached, showing one form of construction thereof. Fig. 11 is a plan of the top of the frame with the casing removed, and constructed as shown in Fig. 10. Figs. 12 and 13 are respectively a section and plan of a portion of the frame, showing a modified construction and arrangement of the spring. Fig. 14 is a longitudinal section taken centrally through the fastening, illustrating a modified construction thereof. Figs. 15 and 16 are respectively a side elevation and plan of the inner casing used in the form of construction shown in Fig. 14.

On Sheet 3, Fig. 17, is a longitudinal section of the fastening when used as a side-catch of the frame, showing the turning-bar in its locked position. Fig. 18 is a section similar to Fig. 17, showing the locking-bar in its unlocked position. Figs. 19 and 20 are perspective views of a form of construction of a spring-plate; and Figs. 21 and 22 are sections of the locking-bar, taken through that portion thereof which engages with the spring. Fig. 23 is a section of the locking-bar; and Fig. 24 is a section of a spring and a portion of the frame, showing a modified construction. Figs. 25 and 26 are sectional views of the fastening similar to those shown in Figs. 2 and 10, but illustrating a modified arrangement of the spring and turning-bar.

Similar letters of reference indicate corresponding parts in each of the views.

In said views, *a* indicates the frame of the bag or satchel. *b* indicates the casing, which may be formed in several different ways, and which is secured to said frame, and within which is arranged the turning-bar and the spring or springs which co-operate therewith.

The spring or springs which hold the locking-bar in its locked or unlocked position are arranged on either or both sides of said locking-bar, and are so placed that as said locking-bar turns, the projecting detent or lug on said locking-bar engages therewith and is thereby prevented from passing the spring unless sufficient force is applied thereto.

When the improved fastening is used upon the top of the frame, I prefer to employ two springs, one on each side of the locking-bar, as the tendency of the locking-bar, when raised to its unlocked position, as indicated in Fig. 3, is to drop in either direction; but when the fastening is used on the side of the frame only one spring is necessary to hold the locking-bar in its locked or unlocked position, as indicated in Figs. 17 and 18.

The spring-tongues may be variously formed, being either struck up from the plate, as indicated in Figs. 6 and 7, or riveted to an independent plate or to the bag-frame, as indicated in Figs. 10 and 11, or secured on the bag-frame beneath a loop struck up from the body of the frame, which are some of the ways which I have devised for accomplishing the desired result.

The locking-bar consists of a shaft, $c$, having on opposite ends thereof ears or plates $c'$, and a stop or stops, $c^2$, projecting from about the center of the bar. The stop may be formed in one piece, as indicated in Fig. 21, or may be formed in two parts, as indicated in Figs. 2, 3, et seq.

Whether the stop or detent is formed in one piece or is formed in two projections, to lighten the parts, the outer surfaces, $c^3$, should be such a distance apart as to prevent the locking-bar from turning by the engagement of the said outer surfaces of the stops $c^3$ with the springs, so as to cause the ears to engage with the sides of the frame when in its unlocked position, as indicated in Fig. 3, and is also prevented from turning, when in its locked position, as indicated in Fig. 2, such a distance as to cause said ears to become disengaged from the sides of the frame portions.

In Figs. 4 and 5 is indicated a form of construction of the locking-bar in which a single lug, $c^4$, is cast centrally thereon and afterward split on the dotted line $c^5$ and spread apart, forming the portions $c^2$, as indicated in Fig. 5. In order to permit the locking-bar to rotate within the casing, the said locking-bar is either raised above the frame in a suitable plate or on suitable journals, in order to permit the same to turn without the projecting detents striking the frame portions indicated in Figs. 2 and 14; or, when the locking-bar turns upon the top of the frame, a square opening, $a'$, is made therein to permit the said locking-bar to turn without the striking of the stops against the frame.

In the construction shown in Fig. 1 the locking-bar rests upon a plate, $d$, which is elevated above the frame of the bag, and is provided with an opening, $d'$, therein and spring-tongues formed integrally with said plate on opposite sides of said opening, as indicated in Figs. 6 and 7, and is also provided with slots $d^3$, through which the tongues $b'$ of the casing $b$, which rests upon said plate $d$, project, and are riveted or turned up against the under side of the frame portion $a$, as indicated in Figs. 2 and 3. By this construction the locking-bar is elevated above the frame portion $a$ of the bag and the opening $d'$ in the plate $d$ provides sufficient space for the turning of the locking-bar within the case.

Instead of using the form of plate above described to elevate the locking-bar above the frame portion, I have contemplated using the form of construction shown in Fig. 19, which is similar to the plate $d$ in the construction of the springs; but the sides $d^4$ of the plate, instead of projecting downward, project upward and are provided with journals $d^5$ therein, which hold the turning-bar up from the bottom of the plate.

In the construction shown in Fig. 14, et seq., a plate is used similar to that shown in Fig. 19; but the spring, instead of being formed integrally with or struck up from said plate, consists of a piece, $d^6$, riveted to said plate $d$, and bent, as indicated, to provide spring-tongues on the opposite sides of the turning bar.

As shown in Fig. 10, the turning-bar rests directly upon the frame portion $a$, which is recessed at $a'$ to permit the movement of the projecting stops on the turning-bar, and to the frame on opposite sides of said openings are secured the spring-tongues $d^2$, as hereinbefore described.

To facilitate the splitting or spreading apart of the stops when cast in one piece, a notch, $c^6$, is cast in the solid stop $c^4$, as indicated in Figs. 2, 3. The plate $d'$ is formed from a single piece of metal, and while acting to elevate the locking-bar above the bag-frame, also gives an ornamental finish to the casing, and, furthermore, provides the springs which retain the locking-bar in its fastened or unfastened position which are struck up from the said plate.

In Fig. 24 is shown a method of fastening the spring to the bag-frame similar to that illustrated in Figs. 12 and 13, in which the frame is slotted to receive the spring, as indicated in said Fig. 24. The spring shown in Figs. 14, 15 and 16, instead of being riveted to the plate $d$, may be formed as indicated by the dotted lines in Fig. 16, being formed as wide as the plate at the center, and at the ends tapered and bent over similar to the spring $d^6$. The plate $d$, as shown in said Fig. 14, et seq., and in Fig. 19, is confined and inclosed entirely within the casing $b$; but the plate $d$, as shown in Figs. 1, 2, et seq., is somewhat larger than the base of the casing $b$, and is held firmly between the same and the top of the bag-frame by the tongues $b'$ passing through the slots $d^3$ therein, as hereinbefore described, which is one of several ways of securing the parts together.

In Figs. 25 and 26 are illustrated forms of construction in which the retention of the locking-bar is effected by the pressure of the ends of the spring-tongues $d^2$ against the locking-bar, which in this case is without the projecting lugs $c^2$.

I am aware that patents numbered 242,944 and 303,716 have been granted to J. W. Lieb, and R. Flocke, respectively, and hereby disclaim anything in this application anticipated by said patents.

It will be understood that the specific forms of construction herein described and illustrated, but not claimed specifically, are not dedicated to the public, as it is my intention to cover the same by subsequent applications, and hence reserve the right to do so.

Having thus described my invention, I desire to claim the following:

1. A bag or satchel catch consisting of an inclosing-casing, a spring tongue or tongues arranged in said casing, as set forth, and a shaft pivoted in said casing, having ears on the opposite ends thereof which embrace the frame-sections of the bag, and a stop thereon which engages with the free end of said spring tongue or tongues when said shaft is turned, but which is normally disengaged therefrom, for the purposes set forth.

2. A bag or satchel catch consisting of an inclosing-casing, a shaft or locking-bar extending therethrough, and having ears on the opposite ends thereof which engage with the frame-sections of the bag, and stops $c^2$ thereon, substantially as described, spring-tongues arranged on opposite sides of said shaft, with which said stops $c^2$ engage when turned, but normally disengaged therefrom, and retain said locking-bar in its unfastened position, for the purposes set forth.

3. A bag or satchel catch consisting of an inclosing-casing, $b$, a shaft-supporting plate, $d$, provided with spring-tongue or spring-tongues $d^2$, formed integrally therewith, and a locking bar or shaft, $c$, pivotally supported by said plate, and provided with ears $c'$ and stops $c^2$ thereon, substantially as and for the purposes set forth.

4. A bag or satchel catch consisting of an inclosing-casing, $b$, a raised plate, $d$, provided with an opening, $d'$, and spring-tongues $d^2$, struck up from said plate, and a locking bar or shaft extending through said casing over the opening $d'$ and between the spring-tongues $d^2$ in said plate, and provided with ears $c'$ and stops $c^2$ thereon, substantially as and for the purposes set forth.

5. The combination, with the frame-section of a bag, of a fastening device, consisting of an inclosing-casing, a spring tongue or tongues arranged in said casing, as set forth, and a shaft pivoted in said casing, having ears on the opposite ends thereof which engage with the frame-sections of the bag, and stop $c^2$ thereon, which engages with the free end of said spring tongue or tongues when said shaft is turned, but which is normally disengaged therefrom, and means for securing said casing to the bag-frame, for the purposes set forth.

6. The combination, with the frame-section of a bag provided with tongue-receiving slots therein, of a bag-catch consisting of a casing provided with tongues $b'$ thereon, which project through the slots in the bag-frame, as set forth, a raised plate, $d$, provided with an opening, $d'$, spring-tongues $d^2$, struck up from said plate, and slots $d^3$ therein, through which the tongues $b'$ pass, as set forth, and a locking bar or shaft extending through said casing over the opening $d'$ and between the spring-tongues $d^2$ in said plate, and provided with ears $c'$ and stops $c^2$ thereon, substantially as and for the purposes set forth.

In testimony that I claim the invention set forth above I have hereunto set my hand this 3d day of September, 1887.

ROBERT W. CHAPMAN.

Witnesses:
JOHN G. TRUSDELL,
FREDK. C. FRAENTZEL.